March 20, 1956 C. R. STELLJES 2,738,863
EXTRACTOR CLUTCH AND BRAKE CONTROL
Filed Nov. 3, 1954 2 Sheets-Sheet 1
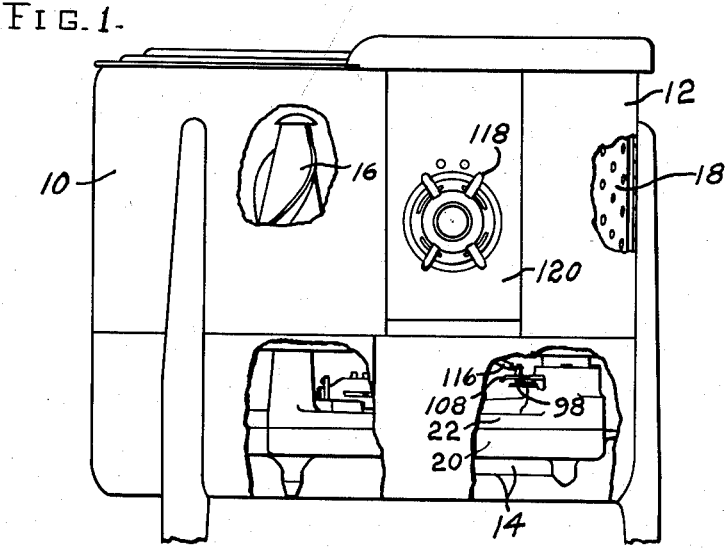
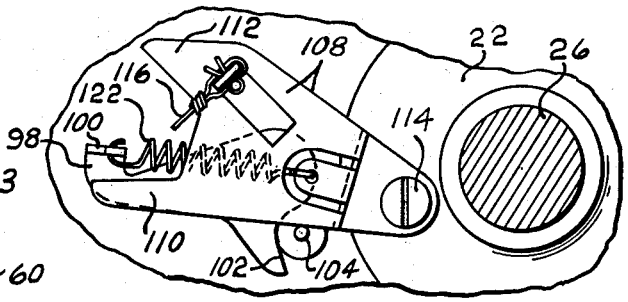
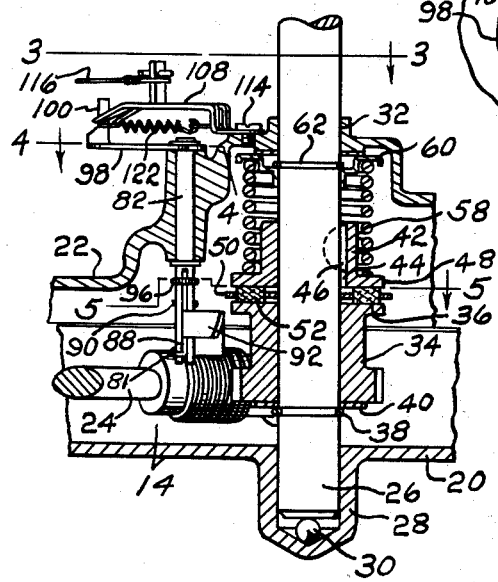
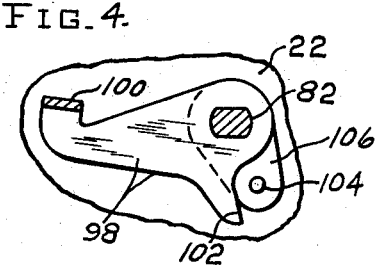
INVENTOR.
CHARLES R. STELLJES
BY
ATTORNEY March 20, 1956  C. R. STELLJES  2,738,863
EXTRACTOR CLUTCH AND BRAKE CONTROL
Filed Nov. 3, 1954  2 Sheets-Sheet 2
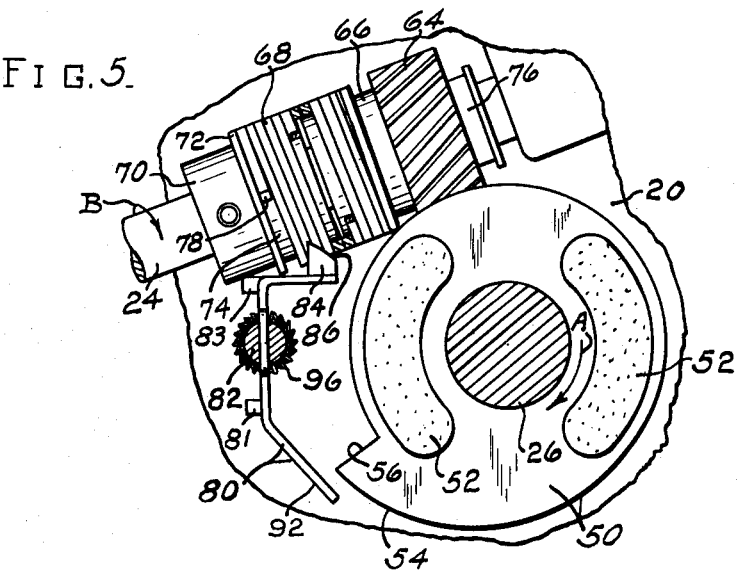
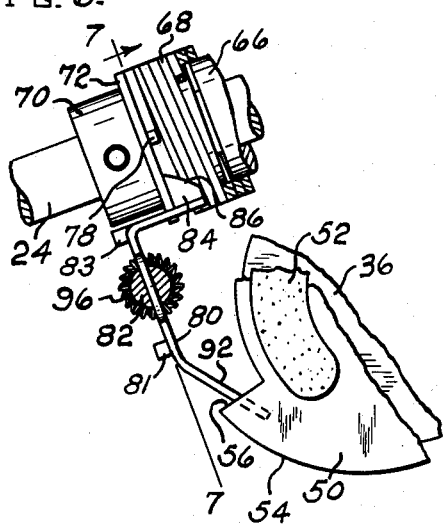
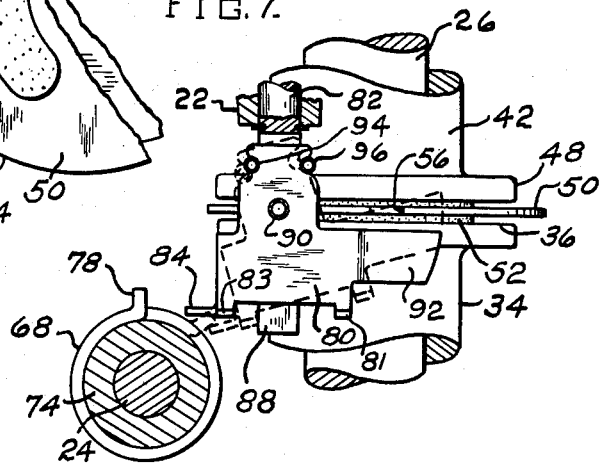
INVENTOR.
CHARLES R. STELLJES
BY
ATTORNEY

United States Patent Office 2,738,863
Patented Mar. 20, 1956

2,738,863

EXTRACTOR CLUTCH AND BRAKE CONTROL

Charles R. Stelljes, Fayetteville, N. Y., assignor, by mesne assignments, to The Murray Corporation of America, Detroit, Mich., a corporation of Delaware Application November 3, 1954, Serial No. 466,637

10 Claims. (Cl. 192—12)

This invention relates to laundry appliances and more particularly to an improved clutch and brake-operating mechanism for controlling the operation of a centrifugal extractor of such a machine.

In an application Serial No. 353,465 filed May 7, 1953, there is disclosed a two-tub centrifugal extractor type washing machine, wherein an overrunning helical coil spring clutch of the LGS type is disclosed in conjunction with the centrifugal extractor drive. In the arrangement shown, the vertical extractor drive shaft is provided with a friction driving member, which is so constructed as to also operate as a brake. The shaft is driven by a pair of helical gears driven from a motor shaft, and there is provided a clutch of the type referred to for coupling the driving gear to the motor-driven shaft. Mechanism is also provided for de-activating the helical clutch spring so as to disconnect the helical driving gear from the motor shaft and simultaneously apply the braking device.

The present invention is directed to an improvement thereover, in which positive means are provided for sequentially actuating the brake after the helical coil spring clutch has been actuated to disengage the helical driving gear from the motor shaft. The arrangement is such that under no circumstances can there be power applied to the extractor basket shaft, at the time the brake is applied. Further, prior to re-engagement of the clutch, the brake is released.

The above and other novel features of the invention will appear more fully hereinafter from the following detailed description, when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevation of a washing machine with parts broken away, to which the invention has been applied;

Figure 2 is a vertical sectional view through the transmission and extractor shaft;

Figure 3 is an enlarged plan fragmentary detail view of the control mechanism for the clutch taken substantially on the line 3—3 of Figure 2;

Figure 4 is a fragmentary sectional view taken substantially on the line 4—4 of Figure 2;

Figure 5 is a fragmentary sectional view taken substantially on the broken line 5—5 of Figure 2; the section being taken within the transmission housing and with the clutch engaged and the brake released;

Figure 6 is a fragmentary view of the sequential operating mechanism within the transmission with the control parts positioned ready to disengage the clutch; and Figure 7 is a fragmentary elevational view of the mechanism of Figure 6 with parts in section and taken substantially on the line 7—7 of Figure 6.

In Figure 1, there is shown a washing machine having a wash tub 10, an extractor tub 12 and a transmission 14 located therebeneath which is adapted to supply the agitating motion for the agitator 16 in the tub 10 and to provide high speed rotary motion to the centrifugal extractor basket 18, it being understood that such transmission is provided with controls so that power can be applied to either the agitator or the extractor basket or both in accordance with the desires of the operator.

In Figure 2 there is shown the transmission casing 14 and particularly the bottom section 20 and the upper section 22, which together form a closed housing. The transmission is in general of the type shown in Patents 2,111,143, and 2,627,175. In such transmission, there is a motor-driven shaft 24 extending horizontally through the transmission on a diagonal, and a vertical extractor shaft 26 journalled at its lower end in a lower casing boss 28, such shaft having a thrust bearing 30. The shaft extends upwardly through the top casing section 22 and may be journalled therein as at 32. On the shaft there is mounted for free rotation a helical driven gear 34 having a sleeve extension and a friction face flange at its upper end as shown at 36. Such pinion is held against axial movement upon the shaft 26 by a lock ring 38 and a thrust washer 40. Keyed to the shaft, but free to move axially thereon, is a friction driving member 42 having a spline keyway 44 coacting with a key 46, such friction member having a lower flange 48 with a friction face facing the friction face of the flange 36. Interposed between the friction flanges 48 and 36 is a friction drive ring 50 or brake disc, such ring being free on the shaft 26 and having suitable friction pads such as 52 mounted thereon. The disc is of generally circular outline but is provided with a spiral radial extension 54 on one side, having an abutment face 56. It will be understood that rotation is in the direction of arrow A.

The friction member 42 is urged downwardly by a compression spring 58 mounted on the shaft 26, the upper end of such compression spring being held in an annular receptor 60, said receptor being positioned on the shaft 26 by a lock ring 62. The compression spring provides the desired amount of axial pressure upon the friction pads 52 so that a steady torque may be applied to the shaft 26 when the helical gear 34 is rotated, the arrangement thus permitting gradual acceleration of the extractor shaft without overloading the driving motor.

The motor-driven shaft 24 (see Figure 5) is provided with a helical driving gear 64 which meshes with the driven gear 34 and which is freely rotatable upon the shaft 24. Such driving gear has a cylindrical collar 66 integral therewith, the cylindrical surface of which is adapted to be engaged by the helical turns of the LGS friction clutch spring 68. Secured to the shaft 24 is a collar 70 having a flange 72 and a cylindrical portion 74 of the same diameter as the cylindrical collar 66, such cylindrical portion being in closely spaced relation to the collar 66 and underlying a substantial portion of the helical turns of the clutch spring 68. A thrust collar 76 secured to the shaft 24 acts to maintain the helical driving gear 64 in proper position with respect to the collar 70.

The helical clutch spring 68 is provided with a radial extension 78, on the end thereof lying over the collar 70, which extension is adapted to be engaged by a rocking actuating arm 80 mounted on a vertical spindle 82. The spindle is journalled in and extends up through the upper casing member 22. The lever 80 is provided with a tongue 84 having an arcuate face 86 which is adapted to be swung into the path of the radial spring end 78, the relative position of such tongue in regard to the coil spring 68 being approximately as shown in Figure 7. The arm 80 is pivotally hung in an axial slot 88 in the spindle 82, the pivot 90 being located above the axis of the shaft 24. It will be seen that by rotating the spindle 82 counter-clockwise as is shown in Figure 5 to the position shown in Figure 6, that the tongue 84 will be brought into the path of rotation of the coil spring end 78 so that the coil spring upon engagement with the tongue 84, is caused to discontinue rotation.

The coil spring has normally light frictional engagement upon the collars 66 and 70, and when such rotation is stopped, the frictional contact tends to expand the diameter of the turns of the helical spring and thereby disengage the turns from the collar 70. The light torque which is continuously applied to the coil spring 68, however, is sufficient to rock the lever 80 about the pivot 90. The lever at its opposite end is provided with an arm 92, which is adapted to be swung toward the vertical shaft 26 when the tongue 84 is moved into position to engage the coil spring end 78, and when engagement is effected between the tongue and the end 78, the lever 80 is rocked on the pivot 90, lifting the arm 92 upward and into the path of the abutment 56 of the friction plate 50.

It will thus be seen that stoppage of the friction plate 50 can only occur in sequence, and after the clutch spring 68 has been engaged and caused to expand so that the driving effect thereof from the motor has been substantially terminated. The lever 80 is provided at its upper end above the pivot 90 with a pair of opposed notches 94 in which there is placed a small garter spring 96, which extends around the spindle 82 and which tends to return the lever to the position shown in Figure 7. Lugs 81 and 83, integral with the actuating arm 80, are adapted to engage the spindle 82 and limit the rocking movement of the arm.

The upper end of the spindle 82 is provided with an overcenter actuating mechanism, there being provided a lever 98 affixed to the upper end of the spindle 82, having an upstanding actuating extension 100 thereon, and a stop arm 102 adapted to engage a pin 104 projecting from the upper face 106 of the transmission housing 22 to limit movement in one direction.

Pivotally mounted upon the casing member 22 and offcenter with respect to the spindle 82 is a lever 108 having forked ends 110 and 112, widely spaced and adapted to engage the actuating extension 100. The lever is pivoted on the screw 114 and is adapted to be actuated by a cable 116 of a cable and conduit control extending to one of the levers, such as 118 on the control panel 120. An overcenter spring 122 connected to the lever 108 near the pivot end and extending to the actuating member 100 of the lever 98, operates to provide snap action of the lever 98 so as to rotate the spindle 82 from the position shown in Figure 5 to that shown in Figure 6, and vice versa.

It will be seen that when the lever is swung to the position shown in Figure 5 that rotation of the shaft 24, which is continuously driven by the drive motor in the direction of arrow B, will provide a self-wrapping action upon the end turns of the coil spring 68 and provide a positive drive to the driving pinion 64, thereby driving the driven pinion 34. The friction pads 52 of the disc 50 will transmit a substantially uniform friction torque to the extractor shaft 26 through the driving member 42, and cause the same to gradually accelerate to the speed of the driven gear 34.

When it is desired to stop the extractor, the spindle 82 is swung to the position shown in Figure 6 by the overcenter mechanism, where the tongue 84 is projected into the path of the coil spring end 78, so that upon contact the turns of the coil spring 68 are expanded and the positive drive to the gear 64 discontinued. At the same time, the lever 80 is rocked to the position shown in dotted in Figure 7, by the slight residual torque in the helical clutch spring 68, resulting in engagement with the abutment face 56 of the friction disc 50. When the friction disc 50 is thus stopped, the extractor shaft 26 is frictionally retarded or braked and caused to come to rest without undue delay. When it is again desired to accelerate the extractor basket, the spindle 82 is rotated clockwise by actuation of the overcenter mechanism through the cable and conduit control. Thus the helical coil spring 68 is released, and provides a positive drive to the gear 64, but before such release can take place, the arm 92 is swung away from the shaft 26, and clear of the abutment 56 on the friction disc 50.

It will thus be seen that by the manipulation of the lever 108, requiring a minimum of manual effort, a positive accelerating drive, or braking is provided for. In either case, the sequence of operation is such as to release the brake before engaging the helical spring clutch, or to disengage the clutch before applying the brake.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

1. In a washing machine centrifugal extractor control, a transmission casing, an extractor basket shaft journalled in said casing and projecting upwardly therefrom, a driven gear freely rotatable on said shaft having a friction-driving face, a driven element keyed to said shaft and having a friction face, a friction element freely rotatable on said shaft and interposed between said faces, means for maintaining frictional engagement between said faces and friction element, a drive shaft in said casing having a drive gear meshing with said driven gear, overrunning clutch means for coupling said drive pinion with said drive shaft, comprising a helical self-gripping coil spring, means for engaging an end of said helical spring to release its driving grip, and means responsive to engagement of said engaging means with said coil spring end, for stopping the rotation of said friction element.

2. In a clutch and brake control, a transmission casing, a driven shaft journalled in said casing, a driven gear freely rotatable on said shaft having a friction driving face, a driven element keyed to said shaft and having a friction face, a friction element freely rotatable on said shaft and interposed between said faces, means for yieldingly urging said friction element into engagement with said faces under substantially constant pressure, a drive shaft in said casing having a drive gear meshing with said driven gear, overrunning clutch means for coupling said drive pinion with said drive shaft, comprising a helical self-gripping coil spring, means for engaging an end of said helical spring to release its driving grip, and means responsive to engagement of said engaging means with said coil spring end, for stopping the rotation of said friction element.

3. In a clutch and brake control, a transmission casing, a driven shaft journalled in said casing, a driven gear freely rotatable on said shaft having a friction driving face, a driven element splined to said shaft and having a friction face, a friction element freely rotatable on said shaft and interposed between said faces, yielding means for urging said faces toward each other, a drive shaft in said casing having a drive gear meshing with said driven gear, overrunning clutch means for coupling said drive pinion with said drive shaft, means for releasing said overrunning clutch, and means responsive to actuation of said releasing means for stopping the rotation of said friction element.

4. In a washing machine centrifugal extractor control, a transmission casing, an extractor basket shaft journalled in said casing and projecting upwardly therefrom a driven gear freely rotatable on said shaft having a friction driving face, a driven element splined to said shaft and having a friction face, a friction element freely rotatable on said shaft and interposed between said faces, means for holding said faces against said friction element under constant pressure, a drive shaft in said casing having a drive gear meshing with said driven gear, overrunning clutch means for coupling said drive pinion with said drive shaft, comprising a helical self-gripping coil spring, and pivotal means mounted in said casing for engaging an end of said helical spring to release its driving grip, said pivotal means comprising means responsive to engagement of said engaging means with said coil spring end for stopping the rotation of said friction element.

5. In a washing machine centrifugal extractor control, a transmission casing, an extractor basket shaft journalled in said casing and projecting upwardly therefrom, a driven gear freely rotatable on said shaft having a friction driving face, a driven element splined to said shaft and having a friction face, a friction element freely rotatable on said shaft and interposed between said faces, means for holding said faces against said friction element under constant pressure, a drive shaft in said casing having a drive gear meshing with said driven gear, overrunning clutch means for coupling said drive pinion with said drive shaft, comprising a helical self-gripping coil spring, pivotal means mounted in said casing for engaging an end of said helical spring to release its driving grip, said pivotal means comprising means responsive to engagement of said engaging means with said coil spring end for stopping the rotation of said friction element, and snap action means for rotating said pivotal means into and out of engagement with the end of said helical spring.

6. In a washing machine centrifugal extractor control, a transmission casing, an extractor basket shaft journalled in said casing and projecting upwardly therefrom, a pair of friction drive members on said shaft including an intermediate friction element adapted to frictionally drive one member from the other, one of said members being keyed to said shaft, means for stopping the rotation of said keyed member, releasable overrunning clutch drive means for driving the other member, and means for releasing said overrunning clutch drive means, said releasing means acting in response to the releasing of said clutch means to actuate said stopping means whereby to sequentially stop said element upon releasing said clutch means.

7. In a clutch and brake control, a transmission casing, a driven shaft journalled in said casing, a pair of friction drive members on said shaft including an intermediate friction element adapted to frictionally drive one member from the other, one of said members being keyed to said shaft, means for stopping the rotation of said element to frictionally brake the rotation of said keyed member, releasable overrunning clutch drive means for driving the other member, and means for releasing said overrunning clutch drive means, said releasing means acting in response to the releasing of the clutch means to actuate said stopping means whereby to sequentially stop said element upon releasing said clutch means.

8. In a clutch and brake control, a transmission casing, a driven shaft journalled in said casing, a pair of friction drive members on said shaft including an intermediate friction element adapted to frictionally drive one member from the other, one of said members being keyed to said shaft, means for stopping the rotation of said element to frictionally brake the rotation of said keyed member, releasable overrunning clutch drive means for driving the other member, pivotal means mounted in said casing and adapted for movement into position for releasing said overrunning clutch drive means, said releasable means acting in response to the releasing of said clutch means to actuate said stopping means whereby to sequentially stop said element upon releasing said clutch means, and snap action means for rotating said pivotal means into and out of overrunning clutch releasing position.

9. In a washing machine centrifugal extractor control, a transmission casing, an extractor basket shaft journalled in said casing and projecting upwardly therefrom, a pair of friction drive members on said shaft including an intermediate friction element adapted to frictionally drive one member from the other, said friction element having a radial abutment, one of said members being keyed to said shaft, means adapted to move into the path of said abutment for stopping the rotation of said element to frictionally brake the rotation of said keyed member, releasable overrunning clutch drive means for driving the other member, and means for releasing said overrunning clutch drive means, said releasing means acting in response to the releasing of the clutch means to move said stopping means into abutment engaging position, whereby to sequentially stop said element upon releasing said clutch means.

10. In a clutch and brake control, a driven shaft, a driving shaft, a driving gear on said driving shaft meshing with a gear on said driven shaft, said gears being free to rotate on their respective shafts, an overrunning clutch having a helical coil spring for coupling said driving gear to said driving shaft, friction means for transmitting torque from said driven gear to said driven shaft, said friction means including an intermediate friction disc freely rotatable on said shaft, a pivotal control member having a rocking member provided with an arm pivotally mounted thereon adapted to be moved into engagement with an end of said helical coil spring to release said clutch upon rotation of said control member to bring said arm into the engagement with said end, an abutment on said friction means, a second arm on said rocking member adapted to be moved into the path of said abutment upon rocking movement of the member in response to the torque of said helical coil spring end upon said first-named arm.

No references cited.